United States Patent
Lee et al.

(10) Patent No.: US 9,128,337 B2
(45) Date of Patent: Sep. 8, 2015

(54) DISPLAY APPARATUS

(75) Inventors: Sang-Myoung Lee, Hwaseong-si (KR);
Namseok Roh, Seongnam-si (KR);
Kyungtae Chae, Hwaseong-si (KR);
Hyung-Il Jeon, Incheon (KR); Joo-Han Bae, Seongnam-si (KR); Jihoon Yang, Gwangju (KR)

(73) Assignee: SAMSUNG DISPLAY CO., LTD. (KR)

( * ) Notice: Subject to any disclaimer, the term of this patent is extended or adjusted under 35 U.S.C. 154(b) by 1076 days.

(21) Appl. No.: 13/170,253

(22) Filed: Jun. 28, 2011

(65) Prior Publication Data

US 2012/0190220 A1    Jul. 26, 2012

(30) Foreign Application Priority Data

Jan. 21, 2011  (KR) .................. 10-2011-0006460

(51) Int. Cl.
*G02F 1/1345* (2006.01)
*G02F 1/1333* (2006.01)

(52) U.S. Cl.
CPC ........ *G02F 1/13452* (2013.01); *G02F 1/13336* (2013.01)

(58) Field of Classification Search
CPC ..................... G02F 1/13452; G02F 1/13336
USPC .......................................... 345/204; 439/67
See application file for complete search history.

(56) References Cited

U.S. PATENT DOCUMENTS

| | | | |
|---|---|---|---|
| 5,951,304 A * | 9/1999 | Wildes et al. | 439/67 |
| 6,859,219 B1 * | 2/2005 | Sall | 345/1.1 |
| 2003/0123015 A1 * | 7/2003 | Park | 349/149 |
| 2004/0201787 A1 * | 10/2004 | Sekiguchi et al. | 349/16 |
| 2007/0080433 A1 * | 4/2007 | Lai | 257/666 |
| 2007/0235791 A1 * | 10/2007 | Park et al. | 257/312 |
| 2008/0129944 A1 * | 6/2008 | Park | 349/150 |
| 2008/0158466 A1 * | 7/2008 | Lee | 349/54 |
| 2011/0244752 A1 * | 10/2011 | Lee | 445/24 |

FOREIGN PATENT DOCUMENTS

| | | |
|---|---|---|
| JP | H06-43690 U | 6/1994 |
| JP | 2001-133756 A | 5/2001 |
| KR | 100269947 B1 | 7/2000 |
| KR | 1020010073679 A | 8/2001 |

\* cited by examiner

*Primary Examiner* — Sahlu Okebato
(74) *Attorney, Agent, or Firm* — Cantor Colburn LLP (57) ABSTRACT

A display apparatus includes a display panel, and at least one flexible printed circuit board connected to the display panel. The display panel includes signal lines, pixels connected to the signal lines, and contact pads provided at one end of the signal lines. The flexible printed circuit board includes a fan-out part including a plurality of connection lines corresponding to the contact pads in a one-to-one correspondence, overlapping with the contact pads and connected to the contact pads, and a driving driver connected to the connection lines, the driving driver applying a driving signal to the pixels.

19 Claims, 9 Drawing Sheets

DISPLAY APPARATUS

This application claims priority to Korean Patent Application No. 10-2011-0006460 filed on Jan. 21, 2011, and all the benefits accruing therefrom under 35 U.S.C. §119, the contents of which are herein incorporated by reference in its entirety.

BACKGROUND OF THE INVENTION

1. Field of the Invention

The invention relates to a display apparatus. More particularly, the invention relates to a display apparatus capable of improving display quality thereof.

2. Description of the Related Art

In general, an image display apparatus like a liquid crystal display includes a lower substrate, an upper substrate facing the lower substrate, and a display part disposed between the lower substrate and the upper substrate. The lower substrate includes a plurality of gate lines and a plurality of data lines crossing the gate lines.

The display panel includes a display area in which an image is displayed, and a non-display area in which the image is not displayed. However, since connection lines used to connect a gate driver to the gate lines or a data driver to the data lines are disposed in the non-display area, the area of the non-display area is increased.

BRIEF SUMMARY OF THE INVENTION

Exemplary embodiments of the invention provide a display apparatus capable of improving display quality thereof.

According to an exemplary embodiment, a display apparatus includes a display panel, and at least one flexible printed circuit board connected to the display panel.

The display panel includes a plurality of signal lines extending in an extension direction, a plurality of pixels connected to the signal lines, and a plurality of contact pads extending in the extension direction from one end of the signal lines.

The flexible printed circuit board includes a fan-out part including a plurality of connection lines which correspond to the contact pads in a one-to-one correspondence, overlap with the contact pads and are connected to the contact pads, and a driving driver connected to the connection lines, the driving driver applying a driving signal to the pixels.

In an exemplary embodiment, the display panel includes a display area in which an image is displayed, and a non-display area except for the display area. The display panel includes a first substrate on which the signal lines and the contact pads are disposed, a second substrate facing the first substrate, a sealant disposed along an end portion of the second substrate and providing a space between the first substrate and the second substrate, and a display part provided in the space.

In an exemplary embodiment, the contact pads are disposed in the display area or the non-display area, and the sealant is disposed in the non-display area.

In an exemplary embodiment, the signal lines include data lines and/or gate lines, and the driving driver includes a data driver and/or a gate driver.

In an exemplary embodiment, the display panel may be provided in a plural number, and the display apparatus may be a multi-panel display apparatus.

According to the exemplary embodiments, the fan-out part used to connect the driving driver to the signal lines is disposed on the flexible printed circuit board, and thus an area of the non-display area may be reduced.

BRIEF DESCRIPTION OF THE DRAWINGS

The above and other features of the invention will become readily apparent by reference to the following detailed description when considered in conjunction with the accompanying drawings wherein.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
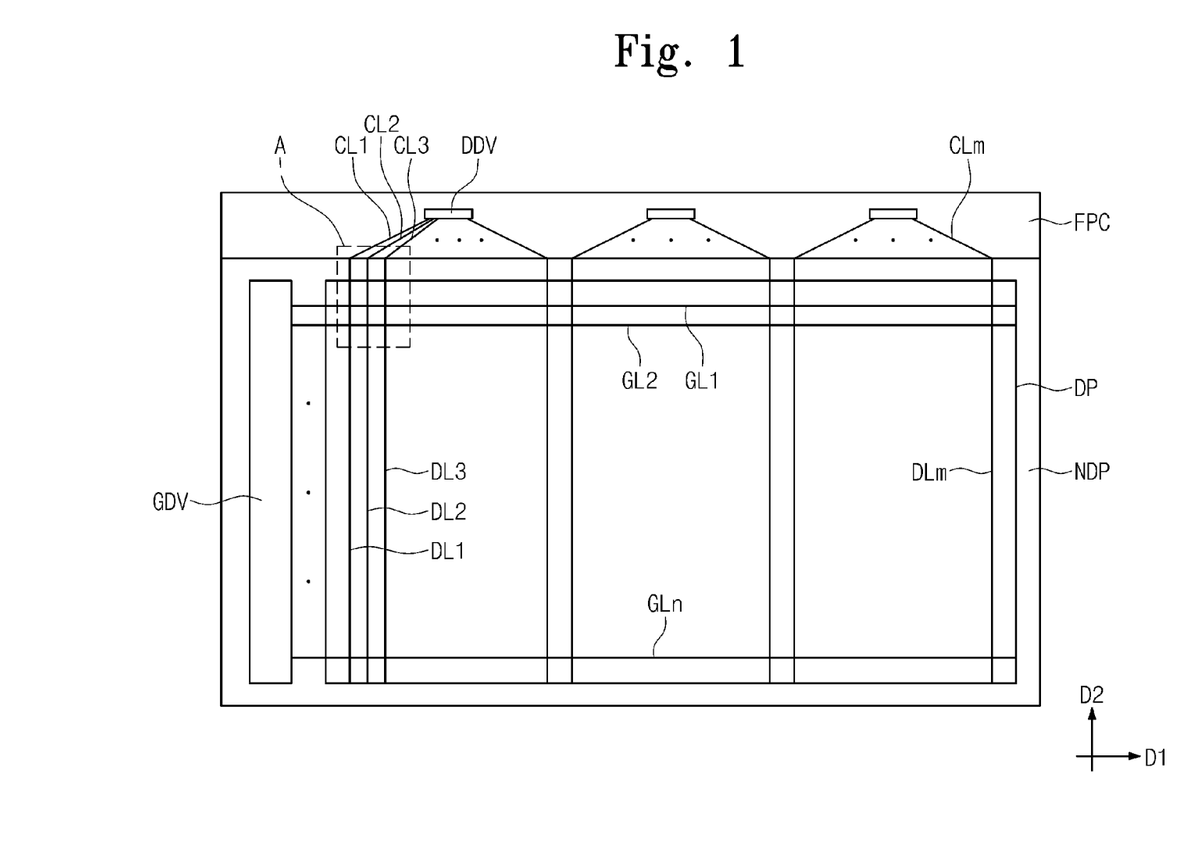
FIG. 1 is a plan view showing an exemplary embodiment of a display apparatus according to the invention.
Figure 2:
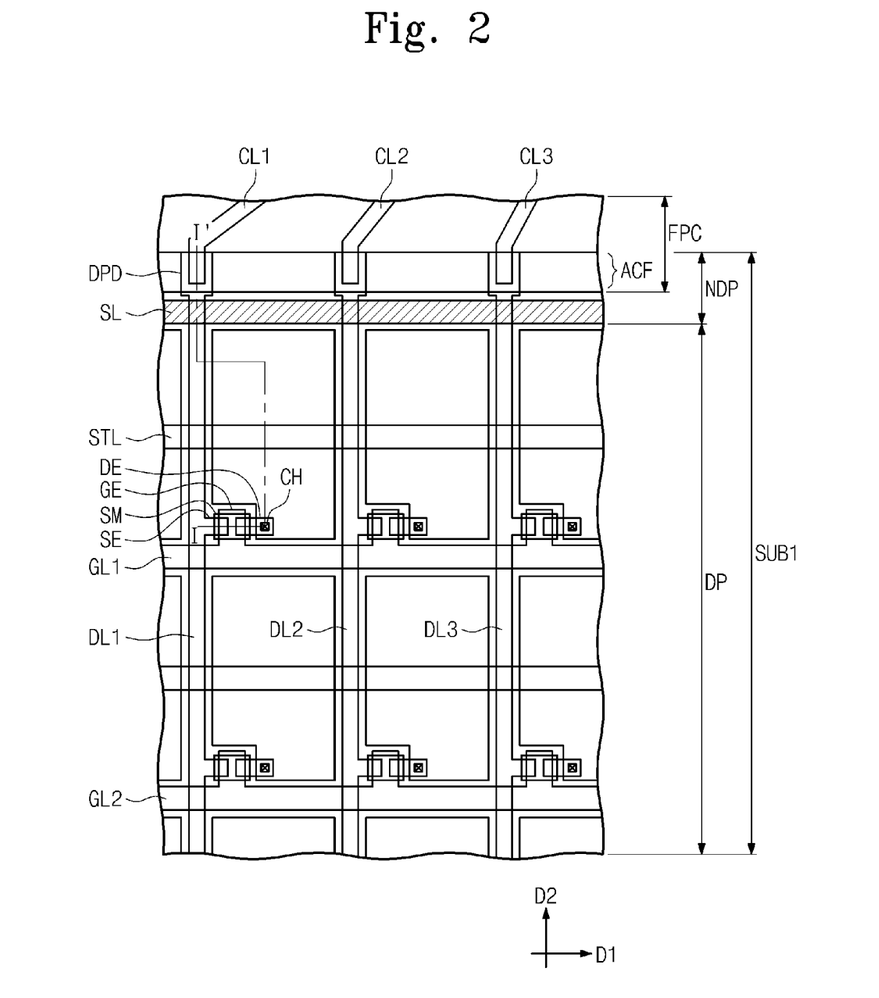
FIG. 2 is an enlarged view showing portion "A" shown in FIG. 1.
Figure 3:
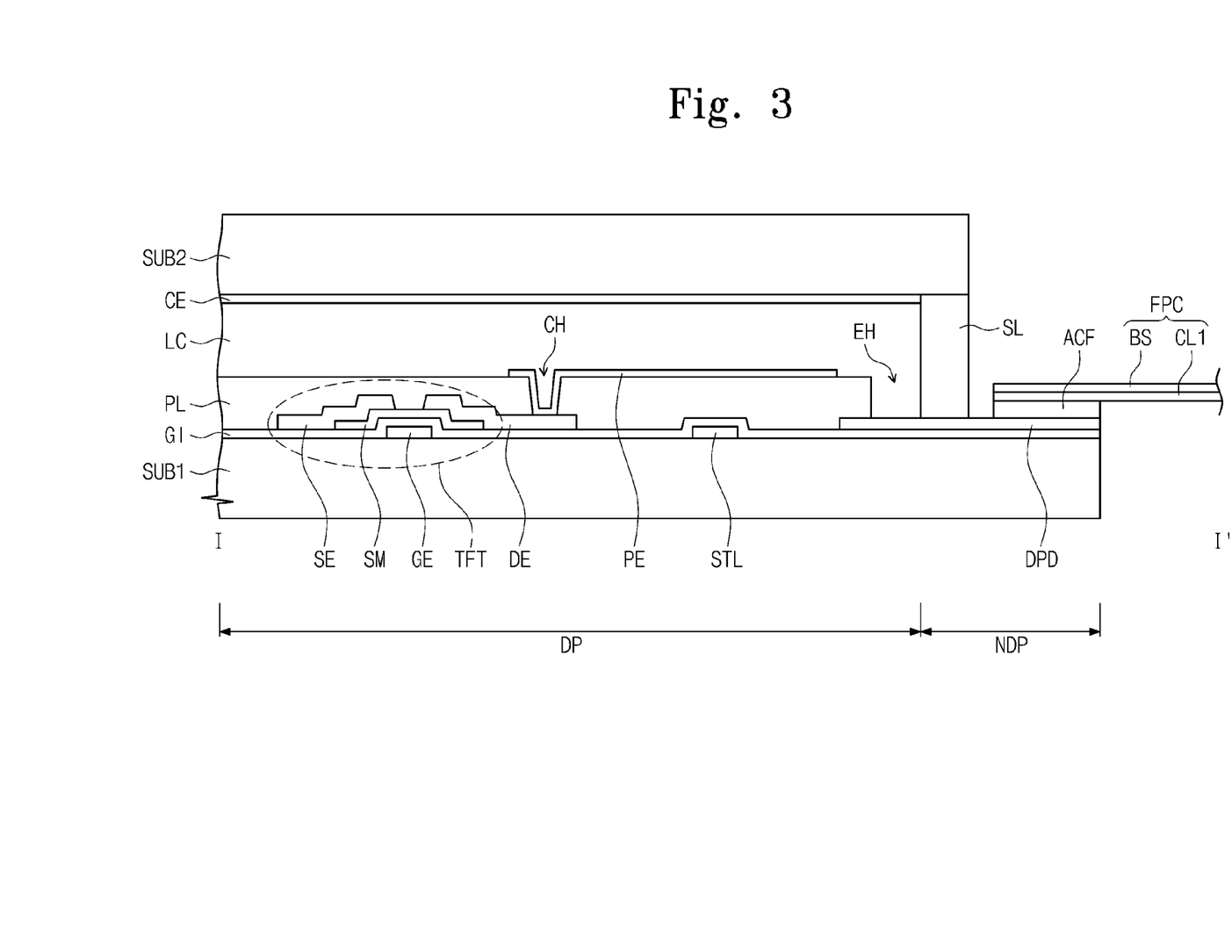
FIG. 3 is a cross-sectional view taken along line I-I' shown in FIG. 2.

FIG. 1 is a plan view showing an exemplary embodiment of a display apparatus according to the invention, FIG. 2 is an enlarged view showing portion "A" shown in FIG. 1, and FIG. 3 is a cross-sectional view taken along line I-I' shown in FIG. 2. In FIGS. 2 and 3, a portion of the connection structure between a display panel and a flexible printed circuit board FPC has been shown, but details of the other portions will be omitted since they have the same connection structure.

In the following description, a signal line indicates a wire used to transmit electrical signals. The signal line may be a gate line, a data line, and/or a storage line. In addition, a driving driver indicates a driving device that outputs a specific signal and applies the specific signal to the signal line. The driving driver may be a gate driver and/or a data driver.

Referring to FIGS. 1 to 3, a display apparatus includes a display panel and at least one flexible printed circuit board FPC connected to the display panel.

When viewed in the plan view, the display panel includes a display area DP in which an image is displayed, and a non-display area NDP except for the display area DP. The non-display area NDP is disposed along the circumference of the display area DP, and a black matrix (not shown) may be disposed in the non-display area NDP to block light from leaking through the display area DP.

The display panel includes a first substrate, a second substrate facing the first substrate, a sealant SL disposed between the first substrate and the second substrate, and a display part LC provided between the first substrate and the second substrate.

The first substrate includes a first insulating substrate SUB1, a plurality of gate lines GL, a gate driver GDV connected to the gate lines GL, a plurality of data lines DL, data contact pads DPD connected to the data lines DL, thin film transistors TFT connected to the gate lines GL and the data lines DL, a protective layer PL, and pixel electrodes PE electrically connected to the thin film transistors TFT.

The gate lines GL are disposed on the first insulating substrate SUB1 and longitudinally extended in a first direction D1. The gate lines GL include first to n-th gate lines GL1 to GLn. The gate lines GL are arranged at regular intervals in a second direction D2, and a distance between two adjacent gate lines GL is uniformly maintained in the second direction D2.

The gate driver GDV is disposed in the non-display area NDP and connected to an end of the gate lines GL to sequentially apply a gate signal to the gate lines GL.

The data lines DL are disposed on the first insulating substrate SUB1 and longitudinally extended in the second direction D2 crossing the first direction D1. The data lines DL are insulated from the gate lines GL by a gate insulating layer GI disposed on the first insulating substrate SUB1 to cover the gate lines GL. The data lines DL include first to m-th data lines DL1 to DLm. In the illustrated exemplary embodiment, the data lines DL are spaced apart from each other and arranged at regular intervals in the first direction D1, and thus a distance between two adjacent data lines DL is uniformly maintained in the first direction D1.

The data contact pads DPD are extended from an end of the data lines DL in the second direction D2 to correspond the data lines DL in a one-to-one correspondence, and are disposed in the non-display area NDP. Each data contact pad DPD has a width larger than that of a corresponding data line of the data lines DL in the first direction D1, so that the data contact pads DPD may be easily electrically connected to connection lines CL that will be described later. The data contact pads DPD may be continuous with the data lines DL, such that a data contact pad DPD and a corresponding data line DL form a single, unitary indivisible element.

Each thin film transistor TFT is connected to a corresponding gate line of the gate lines GL and a corresponding data line of the data lines DL. In detail, each thin film transistor TFT includes a gate electrode GE branched from the corresponding gate line of the gate lines GL, a source electrode SE branched from the corresponding data line of the data lines DL, and a drain electrode DE spaced apart from the source electrode SE with the gate electrode GE interposed therebetween. In addition, a portion of a semiconductor pattern SM is disposed between the source electrode SE and the drain electrode DE to serve as a conductive channel between the source electrode SE and the drain electrode DE.

The protective layer PL covers the thin film transistors TFT, and includes contact holes CH to expose a portion of the drain electrode DE of each thin film transistor TFT and exposure holes EH to expose a portion of the data contact pads DPD. The exposure holes EH are provided in the non-display area NDP and the connection lines CL may easily contact with the data contact pads DPD through the exposure holes EH.

The pixel electrodes PE are disposed on the protective layer PL. The pixel electrodes PE are connected to the drain electrodes DE of the thin film transistors TFT, respectively, through the contact holes CH.

As shown in FIGS. 2 and 3, a plurality of storage lines STL may be disposed on the first insulating substrate SUB1 to be insulated from the gate lines GL and longitudinally extended in the first direction D1. The storage lines STL form storage capacitors with the pixel electrodes PE, and the protective layer PL interposed between the storage lines STL and the pixel electrodes PE.

The second substrate includes a second insulating substrate SUB2, and a common electrode CE disposed on the second insulating substrate SUB2. The common electrode CE forms an electric field together with the pixel electrode PE.

The sealant SL is disposed in the non-display area NDP and along an end portion of the second substrate to be disposed between the first substrate and the second substrate, thereby providing a space between the first substrate and the second substrate. In FIGS. 2 and 3, the sealant SL is spaced apart from the data contact pads DPD when viewed in the plan view, but the sealant SL may be partially overlapped with the data contact pads DPD.

The display part LC is disposed in the space defined by the first substrate, the second substrate and the sealant SL, and displays the image in response to the electric field generated between the pixel electrode PE and the common electrode CE. The display part LC may be various layers that display the image using the electric field, such as a liquid crystal layer, an electrophoretic layer, an organic light emitting layer, etc.

In the illustrated exemplary embodiment, pixel areas are defined by the first to n-th gate lines GL1 to GLn, and the first to m-th data lines DL1 to DLm in a matrix configuration, but the invention is not limited thereto. The thin film transistors TFT, the pixel electrodes PE, the common electrode CE and the display part LC in pixel areas form pixels.

The flexible printed circuit board FPC includes a base substrate BS, a fan-out part including the connection lines CL and disposed on the base substrate BS, and at least one data driver DDV connected to the connection lines CL.

The base substrate BS includes a polymer material having flexibility and the fan-out part includes the connection lines CL disposed on the base substrate BS. Since the flexible printed circuit board FPC has the flexibility, the flexible printed circuit board FPC may be bent several times according to its position on the display panel. In one exemplary embodiment, for instance, the flexible printed circuit board FPC is provided to be substantially parallel to an upper surface of the first insulating substrate SUB1 in FIGS. 1 to 3, but the flexible printed circuit board FPC may be bent to a rear surface of the first substrate to cover a portion of a side surface and the rear surface of the first substrate.

In addition, the flexible printed circuit board FPC is connected to an external printed circuit board (not shown) to receive various signals from the exterior and apply the signals to the data driver DDV.

First ends of the connection lines CL are connected to the data contact pads DPD in a one-to-one correspondence and the connection lines CL include first to m-th connection lines CL1 to CLm corresponding to the number of the data lines DL. The connection lines CL are connected to the data contact pads DPD in the exposure holes EH with an anisotropic conductive film ACF interposed between the connection lines CL and the data contact pads DPD, and are overlapped with a portion of the data contact pads DPD when viewed in the plan view. The anisotropic conductive film ACF is longitudinally extended in the first direction D1 and is provided in the area where the flexible printed circuit board FPC is overlapped with the first substrate.

Second ends opposite to the first ends of the connection lines CL are connected to the data driver DDV. A distance between two adjacent connection lines CL in the fan-out part gradually decreases from the data contact pads DPD to the data driver DDV. Each connection line CL is connected between a corresponding data contact pad of the data contact pads DPD and the data driver DDV to transmit a signal between the corresponding data contact pad and the data driver DDV. To this end, each connection line CL may be bent at least once when viewed in the plan view.

The data driver DDV outputs data signals to the data lines DL. The data driver DDV may be provided in a plural number. Thus, the data lines DL may be divided into a plurality of groups and each group of the data lines DL may be connected to a single one of the data drivers DDV, that is, the each group of the data lines DL and the one data driver DDV are in a one-to-one correspondence. In FIG. 1, three data drivers DDV have been shown, but invention is not limited thereto or thereby.

In the display apparatus having the above-mentioned structure, the gate signal output from the gate driver GDV is sequentially applied to the gate lines GL, and the data signal output from the data driver DDV is applied to the first to m-th data lines DL1 to DLm disposed on the first substrate. Accordingly, the voltage may be applied to the pixel electrodes PE through the thin film transistors TFT, thereby displaying the image.

According to the display apparatus of the illustrated exemplary embodiment, the fan-out part used to connect the data lines DL and the data driver DDV is on the flexible printed circuit board FPC, so a size of the non-display area NDP may be reduced compared with that of conventional display apparatus. In addition, since the flexible printed circuit board FPC may be bent to the rear surface of the first substrate to cover a portion of the side surface and the rear surface of the first substrate, a width of the non-display area NDP in the first and/or second directions D1 and D2 may be more reduced.

In addition, the data contact pads DPD are arranged in the direction D1 in which the data lines DL are arranged, and thus the distance between the two adjacent data contact pads DPD may become wide. Accordingly, the data contact pads DPD may have a wide size in the first direction D1, thereby increasing the overlap area between the data contact pads DPD and the connection lines CL when the data contact pads DPD are connected to the connection lines CL. As a result, misalignment of the data contact pads DPD and the connection lines CL may be reduced or effectively prevented.

Figure 4:
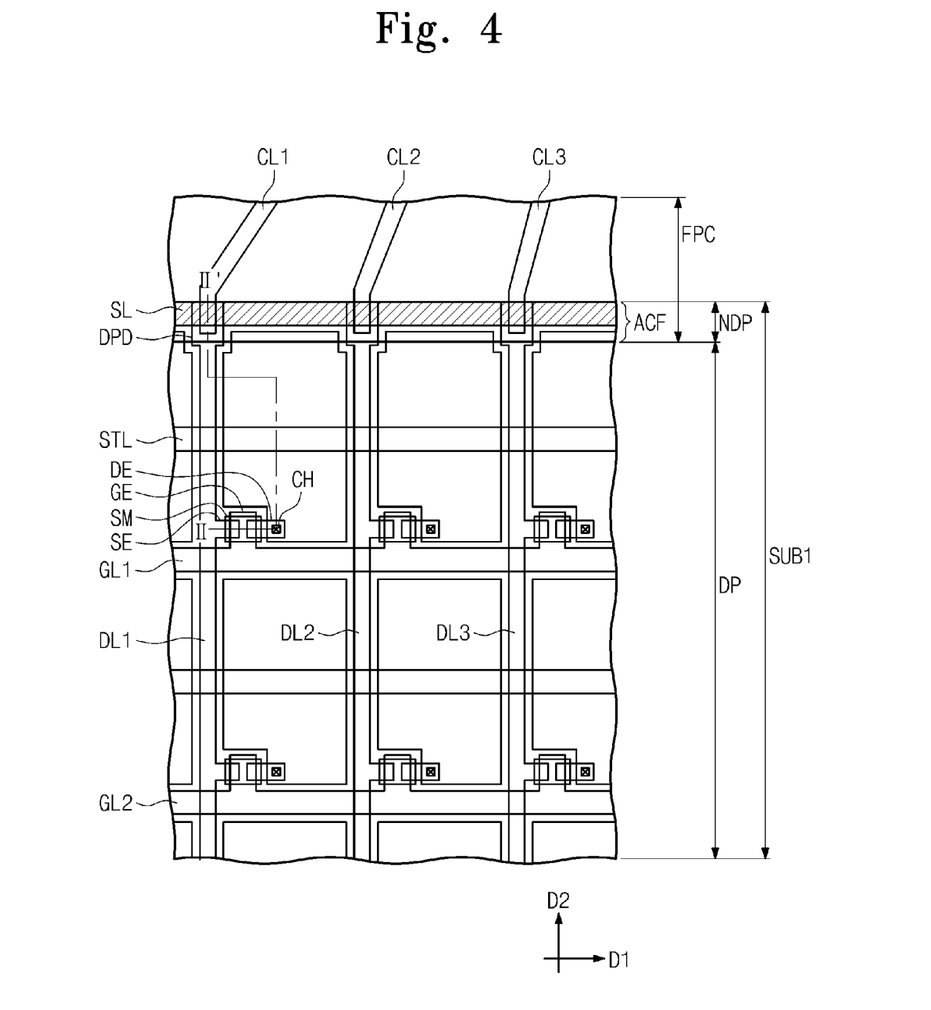
FIG. 4 is a plan view showing another exemplary embodiment of a display apparatus according to the invention.
Figure 5:
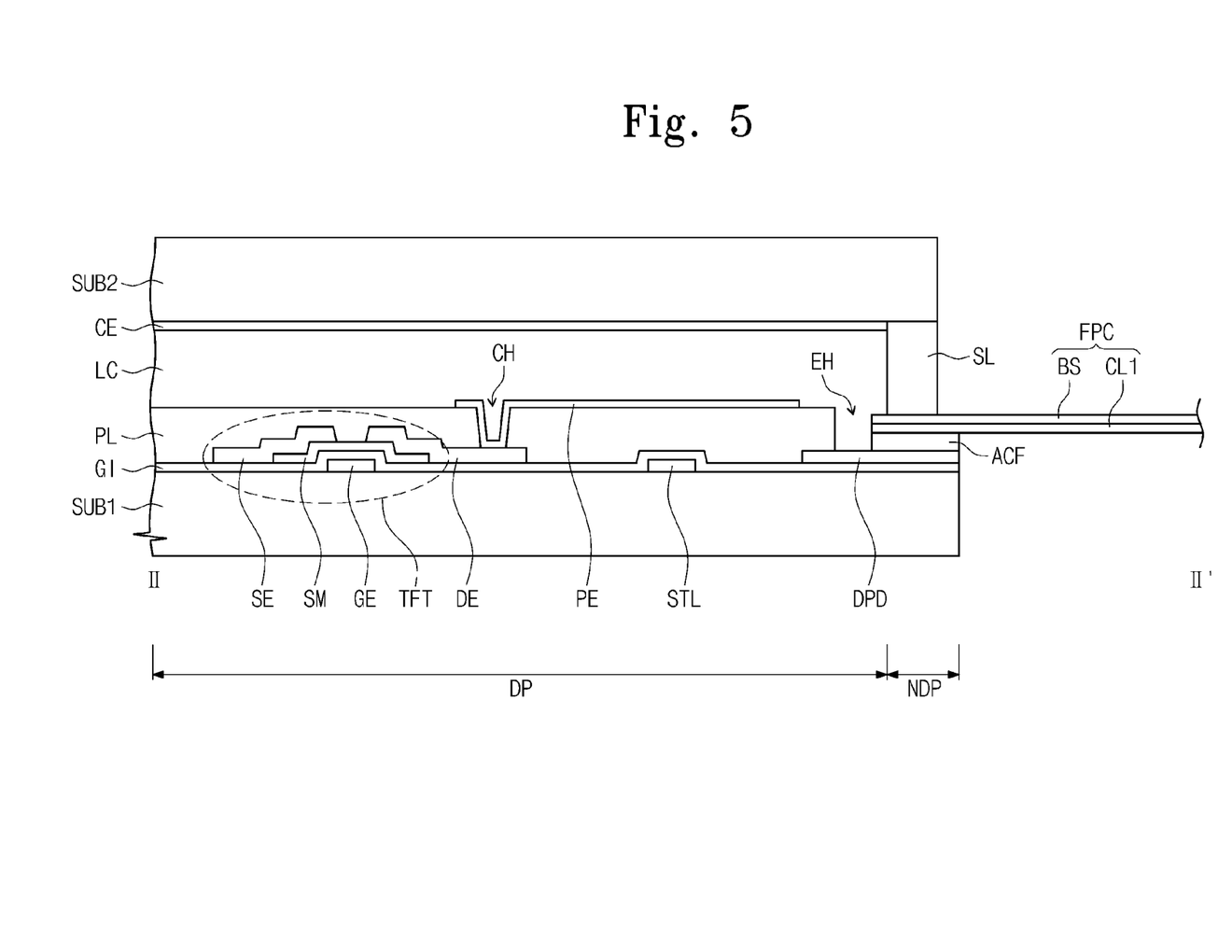
FIG. 5 is a cross-sectional view taken along line II-II' shown in FIG. 4.

FIG. 4 is a plan view showing another exemplary embodiment of a display apparatus according to the invention, and FIG. 5 is a cross-sectional view taken along line II-II' shown in FIG. 4. In FIGS. 4 and 5, the same reference numerals denote the same elements in FIGS. 1 to 3, and thus detailed description of the same elements will be omitted.

Referring to FIGS. 1, 4, and 5, a portion of the data contact pads DPD is disposed in the display area DP, and a remaining portion of the data contact pads DPD is disposed in the non-display area NDP. However, the data contact pads DPD may be disposed only in the display area DP. FIGS. 4 and 5 show the data contact pads DPD disposed both in the display area DP and the non-display area NDP as an example, but the invention is not limited thereto.

In detail, the data contact pads DPD extend from the end portions of the data lines DL in the second direction D2 to correspond to the data lines DL in a one-to-one correspondence. The portion of the data contact pads DPD is disposed in the pixel areas corresponding to a row most adjacent to the flexible printed circuit board FPC such that the portion of the data contact pads DPD is overlapped with the display area DP in which the image is displayed. In addition, each data contact pad DPD has the width in the first direction D1, which is larger than the width of the corresponding data line DL, to allow each data contact pad DPD to be easily electrically connected to the corresponding connection line of the connection lines CL.

Each thin film transistor TFT is connected to a corresponding gate line of the gate lines GL and a corresponding data line of the data lines DL.

The protective layer PL covers the thin film transistors TFT and includes the contact holes CH to expose the portion of the drain electrode DE of each thin film transistor TFT, and the exposure holes EH to expose the portion of the data contact pads DPD. The exposure holes EH are provided in the display area DP and the non-display area NDP, and thus the connection lines CL may easily contact with the data contact pads DPD through the exposure holes EH.

The pixel electrodes PE are disposed on the protective layer PL and not in areas corresponding to the data contact pads DPD. The pixel electrodes PE are connected to the drain electrodes DE of the thin film transistors TFT, respectively, through the contact holes CH.

The sealant SL is along the end portion of the second substrate to be disposed between the first substrate and the second substrate, thereby providing the space between the first substrate and the second substrate. The sealant SL is overlapped with the data contact pads DPD when viewed in the plan view, but the sealant SL may be not overlapped with the data contact pads DPD when the data contact pads DPD are only in the display area DP The flexible printed circuit board FPC is provided to be overlapped with a portion of the display area DP and the non-display area NDP. Accordingly, when viewed in the plan view, an area of the sealant SL is overlapped with an area of the flexible printed circuit board FPC. In addition, the flexible printed circuit board FPC may be partially overlapped with the pixel electrodes PE in the display area DP. The base substrate BS of the flexible printed circuit board FPC includes a transparent polymer material, so that the image may be displayed through the overlapped area between the flexible printed circuit board FPC and the pixel electrodes PE.

The first ends of the connection lines CL are connected to the data contact pads DPD in a one-to-one correspondence and the connection lines CL include first to m-th connection lines CL1 to CLm corresponding to the number of the data lines DL. The connection lines CL are connected to the data contact pads DPD in the exposure holes EH with the anisotropic conductive film ACF interposed between the connection lines CL and the data contact pads DPD. The anisotropic conductive film ACF is longitudinally extended in the first direction D1 and is provided in the area where the flexible printed circuit board FPC is overlapped with the first substrate.

According to the display apparatus of the illustrated exemplary embodiment, only the area of the sealant SL corresponds to the non-display area NDP when viewed in the plan view. Thus, the display apparatus according to the illustrated exemplary embodiment may have the non-display area NDP smaller than that of the display apparatus according to the exemplary embodiment in FIGS. 1 to 3.

Figure 6:
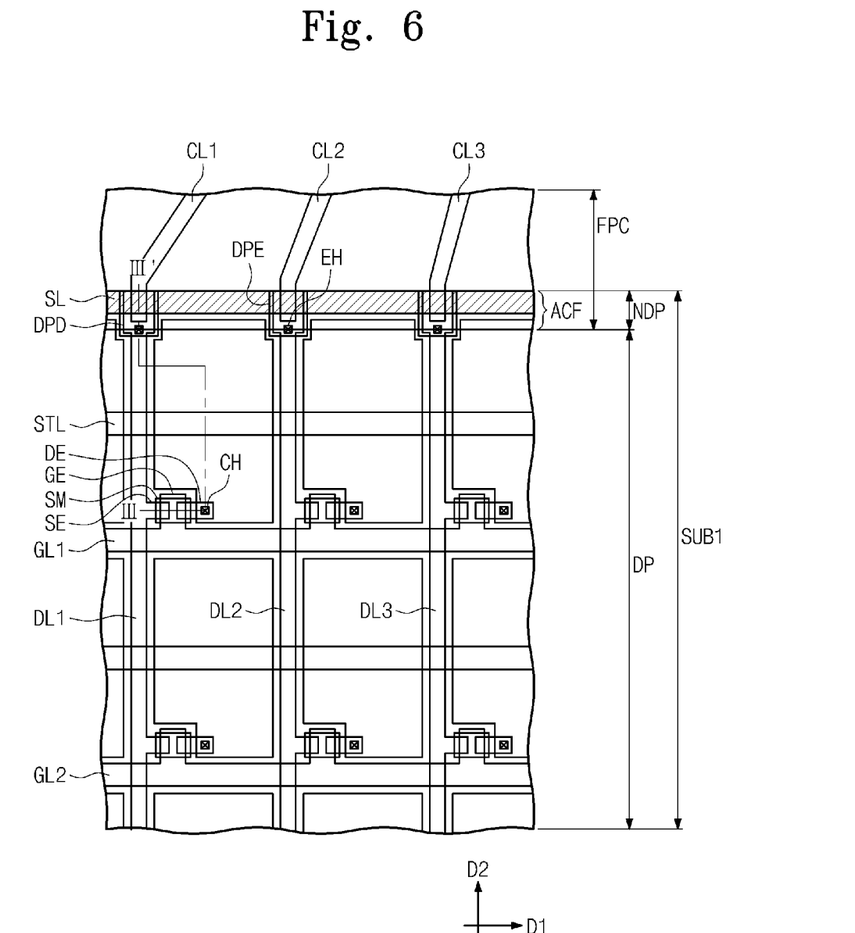
FIG. 6 is a plan view showing another exemplary embodiment of a display apparatus according to the invention.
Figure 7:
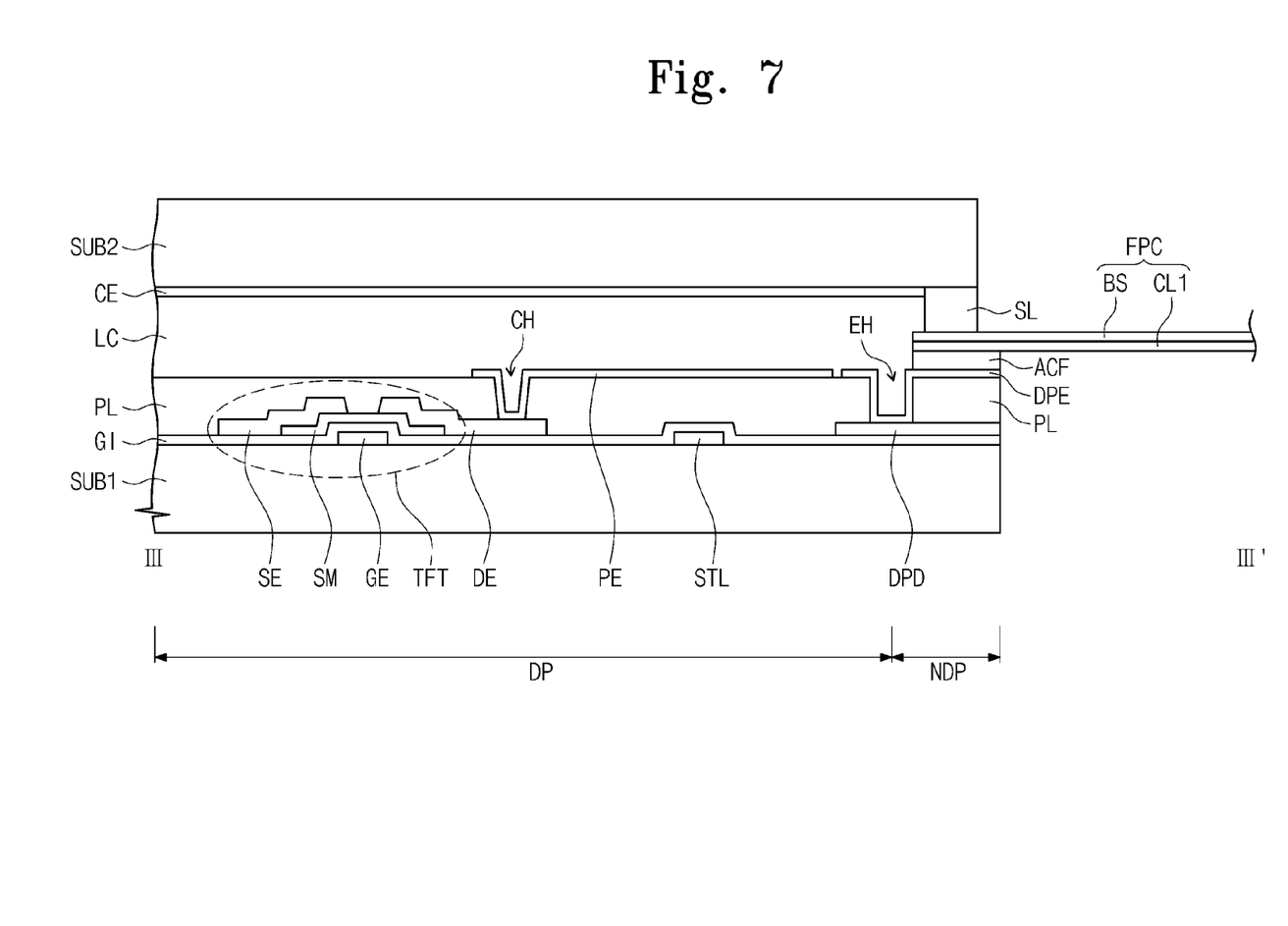
FIG. 7 is a cross-sectional view taken along line III-III' shown in FIG. 6.

FIG. 6 is a plan view showing another exemplary embodiment of a display apparatus according to the invention and FIG. 7 is a cross-sectional view taken along line III-III' shown in FIG. 6. In FIGS. 6 and 7, the same reference numerals denote the same elements in FIGS. 1, 4 and 5, and thus detailed description of the same elements will be omitted in order to avoid the redundancy.

Referring to FIGS. 1, 6, and 7, the first substrate of the display apparatus includes data pad electrodes DPE connected to the data contact pads DPD.

The protective layer PL covers the thin film transistor TFT and includes the contact holes CH to expose the portion of the drain electrode DE of the thin film transistors TFT, and the exposure holes EH to expose the portion of the data contact pads DPD.

The pixel electrodes PE and the data pad electrodes DPE are disposed on the protective layer PL. The pixel electrodes PE are connected to the drain electrode DE through the contact holes CH and the data pad electrodes DPE are connected to the data contact pads DPD through the exposure holes EH. In an exemplary embodiment, the data pad electrodes DPE may be formed together with the pixel electrodes PE when the pixel electrodes PE are formed. In this case, the data pad electrodes DPE may include a same material as the pixel electrodes PE and may be disposed on a same layer, e.g., the protective layer PL, as the pixel electrodes PE. The data pad electrodes DPE are spaced apart from the pixel electrodes PE on the protective layer PL.

The flexible printed circuit board FPC is connected to the data pad electrodes DPE with the anisotropic conductive film ACF interposed therebetween. The anisotropic conductive film ACF is disposed in the area where the flexible printed circuit board FPC is overlapped with the first substrate.

The flexible printed circuit board FPC is provided to be overlapped with a portion of the display area DP and the non-display area NDP, and with an area of the sealant SL.

Since the flexible printed circuit board FPC is connected to the data pad electrodes DPE on the protective layer PL, an upper surface of the first substrate has a uniform height. Accordingly, connection defects between the flexible printed circuit board FPC and the data contact pads DPD, which are caused by the step difference on the upper surface of the first substrate, may be reduced or effectively prevented. In addition, the data pad electrodes DPE may be formed with the pixel electrodes PE through the process applied to form the pixel electrodes PE, so that no additional process is required to form the data pad electrodes DPE.

Figure 8:
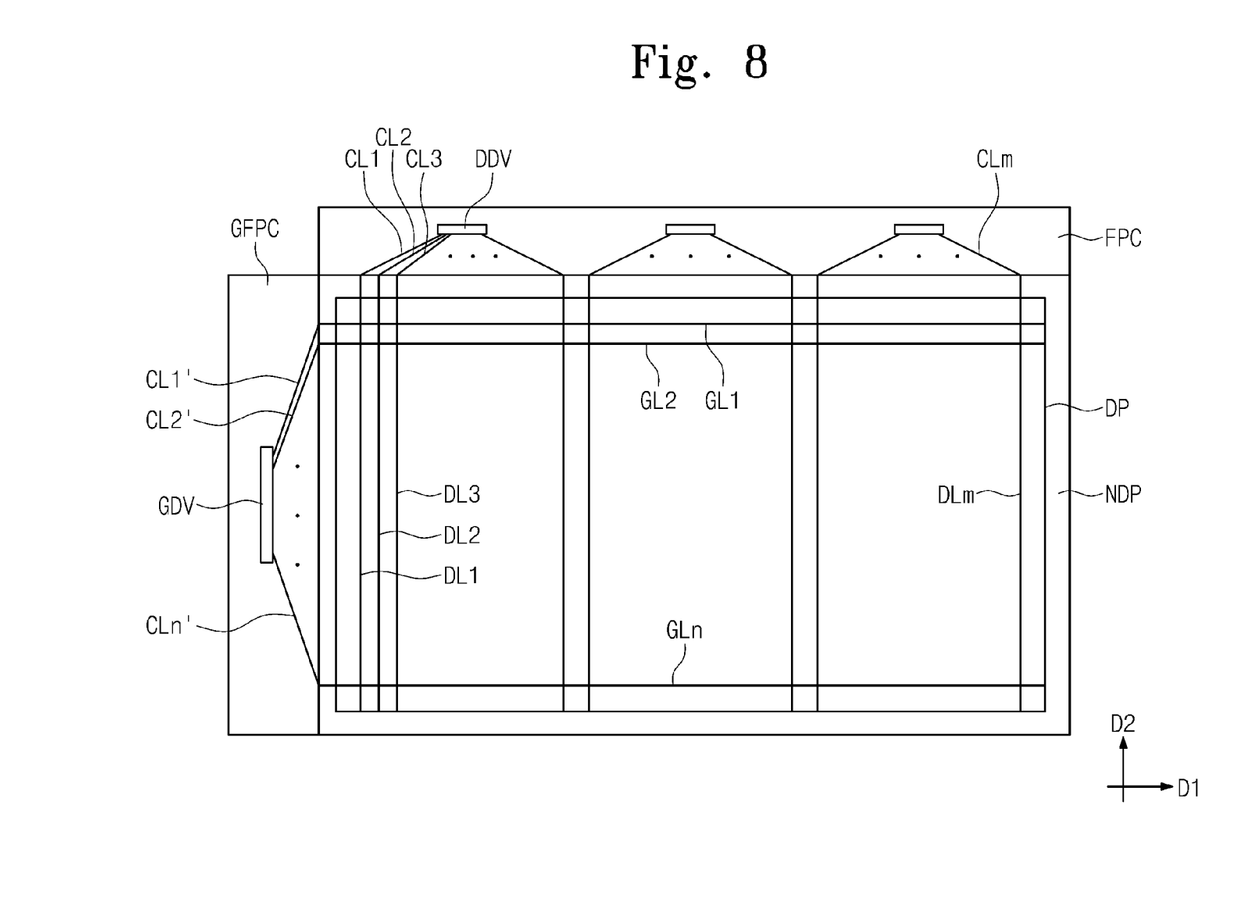
FIG. 8 is a plan view showing another exemplary embodiment of a display apparatus according to the invention.

FIG. 8 is a plan view showing another exemplary embodiment of a display apparatus according to the invention. In FIG. 8, the same reference numerals denoted the same elements in FIG. 1, and thus detailed description of the same elements will be omitted.

The display apparatus according to the illustrated exemplary embodiment includes a display panel including gate contact pads, a fan-out part including gate connection lines CL' connected to the gate lines GL, and at least one gate flexible printed circuit board GFPC including the gate driver GDV connected to the fan-out part.

The display panel and the gate flexible printed circuit board GFPC have the structure substantially same as those of the display panel and the flexible printed circuit board FPC (e.g., the data flexible printed circuit board) in the exemplary embodiments in FIGS. 1 to 7. That is, the gate contact pads (not shown) correspond to the data contact pads DPD, the gate connection lines CL' connected to the gate lines GL correspond to the connection lines CL connected to the data lines DL, and the gate driver GDV corresponds to the data driver DDV.

Although not provided as a plan or cross-sectional view, the first substrate includes the first insulating substrate SUB1, the plurality of gate lines GL, the gate contact pads connected to the gate lines, the plurality of data lines DL, the data contact pads DPD connected to the data lines DL, the thin film transistors TFT connected to the gate lines GL and the data lines DL, the protective layer PL covering the thin film transistors TFT, and the pixel electrodes PE electrically connected to the thin film transistors TFT.

The gate lines GL are disposed on the first insulating substrate SUB1 and longitudinally extended in the first direction D1. The gate lines GL include first to n-th gate lines GL1 to GLn. The gate lines GL are spaced apart from each other and arranged at regular intervals in the second direction D2, and thus a distance between two adjacent gate lines GL is uniformly maintained in the second direction D2.

The gate insulating layer GI is disposed on the gate lines GL to cover the gate lines GL, and the gate insulating layer GI includes gate exposure holes (not shown) to expose an upper surface of the gate contact pads.

Although not shown in figures, the gate contact pads are disposed in the non-display area NDP and extend from the end portions of the gate lines GL in the first direction D1 to correspond to the gate lines GL in a one-to-one correspondence. Each gate contact pad has a width in the second direction D2, which is larger than a width of the corresponding gate line GL, to allow each gate contact pad to be easily electrically connected to the corresponding connection line of the connection lines CL'. Since the gate contact pads have the width larger than the width of the gate lines GL, misalignment of the gate contact pads and the gate connection lines CL' may be reduced or effectively prevented. In addition, first ends of the gate connection lines CL' are connected to the gate contact pads in a one-to-one correspondence and the gate connection lines CL' include first to n-th connection lines CL1' to CLn' corresponding to the number of the gate lines GL.

The data lines DL longitudinally extend in the second direction D2 crossing the first direction D1. The data lines DL are insulated from the gate lines GL with the gate insulating layer GI interposed between the gate lines GL and the data lines DL. The data lines DL include first to m-th data lines DL1 to DLm.

The data contact pads DPD are provided in the non-display area NDP and extend from the end portions of the data lines DL in the second direction D2 to correspond to the data lines DL in a one-to-one correspondence.

The protective layer PL covers the thin film transistors TFT and includes contact holes CH to expose the portion of the drain electrode DE of each thin film transistor TFT, and exposure holes EH to expose an upper portion of areas corresponding to the gate contact pads and the data contact pads DPD. The exposure holes EH are provided in the non-display area NDP, and the connection lines CL and CL' may easily contact with the gate contact pads and the data contact pads DPD through the exposure holes EH.

The pixel electrodes PE are disposed on the protective layer PL. The pixel electrodes PE are connected to the drain electrodes DE of the thin film transistors TFT, respectively, through the contact holes CH.

The gate connection lines CL' are connected to the gate contact pads in the area of the gate exposure holes EH with the anisotropic conductive film ACF between the gate connection lines CL' and the gate contact pads. The gate connection lines CL' are partially overlapped with the gate contact pads when viewed in the plan view. The anisotropic conductive film ACF is disposed in the area where the flexible printed circuit board FPC overlaps the first substrate. In addition, the anisotropic conductive film ACF longitudinally extends in the first direction D1 so as to overlap with the data contact pads DPD.

The gate flexible printed circuit board GFPC includes a base substrate BS, a fan-out part including the gate connection lines CL' and disposed on the base substrate BS, and at least one gate driver GDV connected to the connection lines CL'.

In addition, first ends of the gate connection lines CL' are connected to the gate contact pads in a one-to-one correspondence and the gate connection lines CL' include the first to n-th connection lines CL1' to CLn' corresponding to the number of the gate lines GL. The gate connection lines CL' are connected to the gate contact pads in the area of the gate exposure holes EH with the anisotropic conductive film ACF interposed between the gate connection lines CL' and the gate contact pads.

The gate driver GDV sequentially outputs the gate signal to the gate lines GL. The gate driver GDV may be provided in a plural number. In this case, the gate lines GL may be divided into a plurality of groups and each group of the gate lines GL may be connected to a single one of the gate drivers GDV in a one-to-one correspondence. For the convenience of explanation, one gate driver GDV has been shown in FIG. 8, but the invention is not limited thereto or thereby.

The display apparatus having the above-described structure includes the flexible printed circuit board FPC connected to the data lines DL and the gate flexible circuit board GFPC connected to the gate lines GL, and thus the display apparatus may provide the non-display area NDP smaller than that of the conventional display apparatus. Similar to the exemplary embodiment in FIGS. 1 to 3, the gate flexible printed circuit board GFPC according to the illustrated exemplary embodiment may be bent along the edge of the first substrate to cover portions of the side surface and the rear surface of the first substrate. As a result, the size of the non-display area NDP of the display apparatus according to the exemplary embodiment in FIG. 8 may be minimized.

Figure 9:
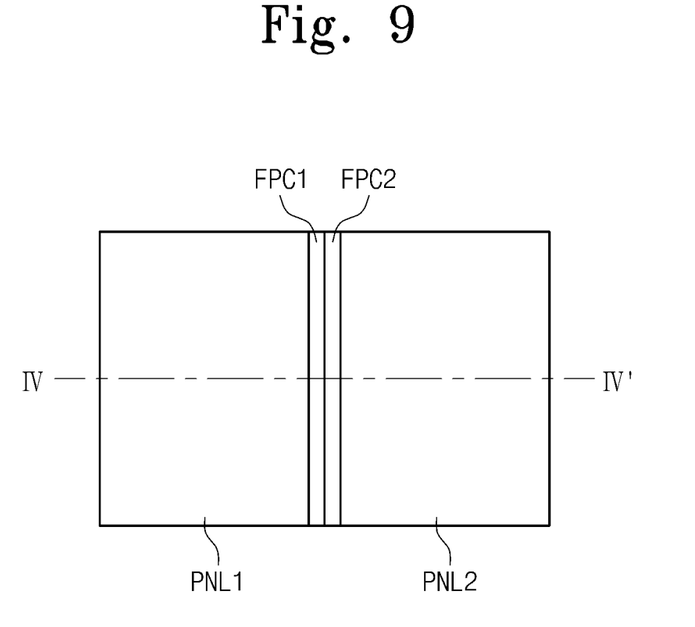
FIG. 9 is a plan view showing another exemplary embodiment of a display apparatus according to the invention.
Figure 10:
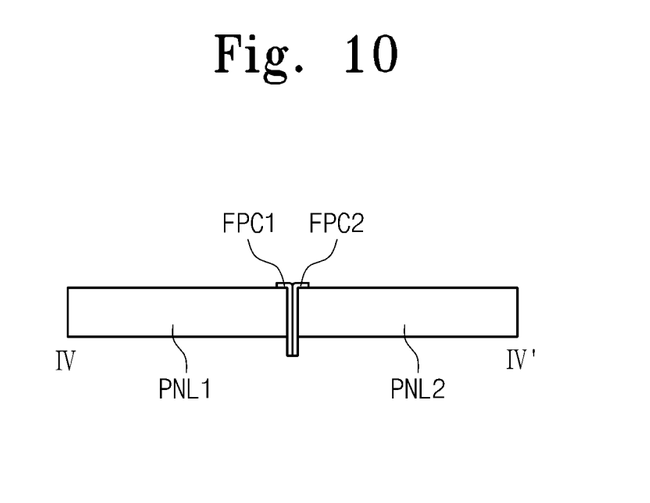
FIG. 10 is a cross-sectional view taken along line IV-IV' shown in FIG. 9.

FIG. 9 is a plan view showing another exemplary embodiment of a display apparatus according to the invention and FIG. 10 is a cross-sectional view taken along line IV-IV' shown in FIG. 9.

According to the exemplary embodiments in FIGS. 1 to 8, the display apparatus has the non-display area NDP smaller than the non-display area of the conventional display apparatus. Thus, the display apparatus according to the exemplary embodiments in FIGS. 1 to 8 may be employed in a multi-panel display apparatus using a plurality of display panels. In this case, since the multi-panel display apparatus employs the display panel having the minimized non-display area NDP, a distance between adjacent display panels is minimized and the continuity of the image between the display panels adjacent to each other may be obtained.

Referring to FIGS. 9 and 10, the display apparatus may include plural display panels, and a first display panel PNL1 and a second display panel PNL2 have been shown as a representative example.

The first display panel PNL1 and the second display panel PNL2 are connected to a first flexible printed circuit board FPC1 and a second flexible printed circuit board FPC2, respectively. Each of the first and second flexible printed circuit boards FPC1 and FPC2 may be connected to any end of a corresponding display panel of the first and second display panels PNL1 and PNL2. In the illustrated exemplary embodiment, the first and second flexible printed circuit boards FPC1 and FPC2 are disposed between the first and second display panels PNL1 and PNL2. Particularly, in the case that the display panels are arranged in a matrix shape, the flexible printed circuit boards may be disposed between adjacent the display panels. In this case, since the non-display area NDP disposed between the display panels is remarkably small, the user may not perceive the non-display area NDP.

In addition, according to the above-described embodiments, the flexible printed circuit board on which the data driver is mounted and on which the data and gate drivers are mounted have been shown, but the invention is not limited thereto or thereby. That is, only the gate driver may be mounted on the flexible printed circuit board.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising: a display panel comprising:
    a plurality of signal lines extending in an extension direction,
    a plurality of pixels connected to the signal lines,
    a plurality of contact pads extending in the extension direction from one end of the signal lines,
    a display area in which an image is displayed, and a non-display area except for the display area;
    a first substrate, the signal lines and the contact pads on the first substrate;
    a second substrate facing the first substrate;
    a sealant along an end portion of the second substrate,
    the sealant providing a space between the first substrate and the second substrate; and
    a display part in the space; and
    a flexible printed circuit board connected to the display panel and comprising: a base substrate;
    a fan-out part including a plurality of connection lines which is on the base substrate, in one-to-one correspondence with the contact pads, first ends of the connection lines overlapped with the contact pads in a plan view and at which the connection lines are connected to the contact pads, and
    a driving driver on the base substrate, connected to the connection lines at second ends of the connection lines opposite to the first ends of the connection lines, wherein the driving driver applies a driving signal to the pixels.

2. The display apparatus of claim 1, wherein the signal lines are in the display area, and the contact pads and the sealant are in the non-display area.

3. The display apparatus of claim 1, wherein the signal lines and the contact pads are in the display area, and the sealant is in the non-display area.

4. The display apparatus of claim 3, wherein the sealant overlaps the base substrate of the flexible printed circuit board when viewed in the plan view.

5. The display apparatus of claim 1, wherein
    the signal lines are gate lines extending in a first direction, or
    the signal lines are data lines extending in a second direction crossing the first direction.

6. The display apparatus of claim 5, wherein the signal lines are the data lines.

7. The display apparatus of claim 6, wherein the driving driver is a data driver which applies a data signal to the data lines.

8. The display apparatus of claim 5, wherein the signal lines are the gate lines.

9. The display apparatus of claim 8, wherein the driving driver is a gate driver which sequentially applies a gate signal to the gate lines.

10. The display apparatus of claim 1, wherein each of the pixels comprises:
    a thin film transistor connected to a corresponding signal line of the signal lines;
    a protective layer which covers the thin film transistor, in which is defined a contact hole which exposes a portion of a drain electrode of the thin film transistor; and
    a pixel electrode connected to the drain electrode through the contact hole.

11. The display apparatus of claim 10, wherein exposure holes are further defined in the protective layer and expose the contact pads.

12. The display apparatus of claim 11, further comprising an anisotropic conductive film between the connection lines and the contact pads, wherein the connection lines are connected to the contact pads with the anisotropic conductive film between the connection lines and the contact pads.

13. The display apparatus of claim 11, further comprising:
    pad electrodes connected to the contact pads through the exposure holes, and
    an anisotropic conductive film between the connection lines and the pad electrodes,
    wherein the connection lines are connected to the pad electrodes with the anisotropic conductive film between the connection lines and the pad electrodes.

14. The display apparatus of claim 13, wherein the pad electrodes comprise a same material as the pixel electrode.

15. The display apparatus of claim 1, wherein each of the contact pads has a width larger than a width of each signal line in a direction perpendicular to the extension direction of the signal lines.

16. The display apparatus of claim 1, wherein the signal lines are spaced apart from each other and arranged at regular intervals.

17. The display apparatus of claim 16, wherein
    on the base substrate of the flexible printed circuit board, a distance between two adjacent connection lines gradually decreases from the first ends thereof at which are connected the contact pads of the display panel to the second ends thereof at which is connected the driving driver.

18. The display apparatus of claim 1, further comprising a plural number of the display panel facing each other at sides thereof, and a plurality of flexible printed circuit boards respectively connected thereto.

19. The display apparatus of claim 18, wherein
    each of the display panels comprises a display area in which an image is displayed, and a non-display area except for the display area, and
    each of the flexible printed circuit boards is connected to the non-display area of a respective display panel and extended between the facing sides of the display panels.

* * * * *